Nov. 5, 1935.  H. W. OTIS  2,020,201

VEHICLE BRAKE

Filed Nov. 12, 1934  2 Sheets-Sheet 1

Harry W. Otis,
INVENTOR

Nov. 5, 1935.  H. W. OTIS  2,020,201
VEHICLE BRAKE
Filed Nov. 12, 1934  2 Sheets-Sheet 2
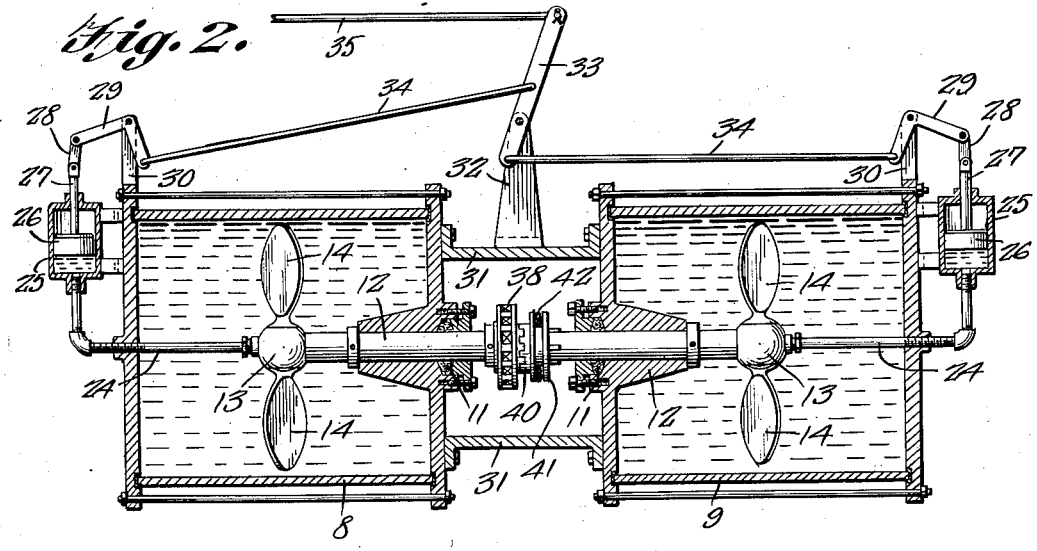
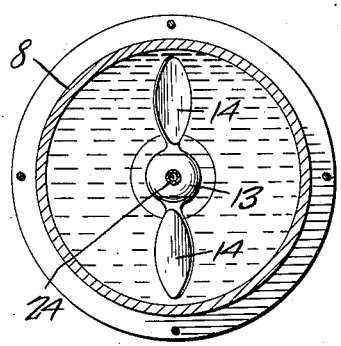
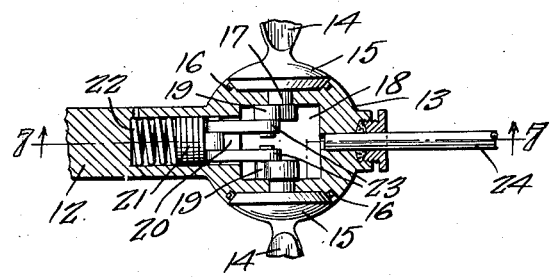
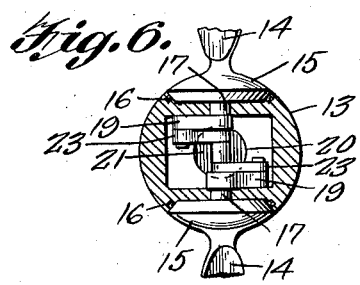
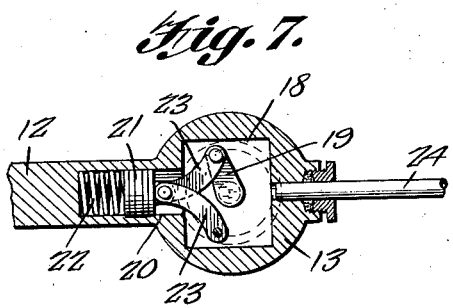
Harry W. Otis,
INVENTOR
BY Victor J. Evans & Co.
ATTORNEY Patented Nov. 5, 1935

2,020,201

UNITED STATES PATENT OFFICE 2,020,201

VEHICLE BRAKE

Harry W. Otis, South Pasadena, Calif.

Application November 12, 1934, Serial No. 752,751

2 Claims. (Cl. 188—90)

This invention relates to brakes and the object is to provide a simple and compact mechanism which may be easily controlled and will operate efficiently to arrest or retard the movement of a rotating element. Other objects will appear as the description proceeds, and the invention resides in certain novel features which will be particularly defined in the appended claims.

In the accompanying drawings:

Figure 2 is a longitudinal vertical section of the brake on a larger scale.

Figure 4 is a transverse section through a cylinder.

Figure 5 is a detail section through the hub of one set of vanes.

Figure 6 is a similar view taken at a right angle to Figure 5.

Figure 7 is a section on the line 7—7 of Figure 5.

Figure 1:
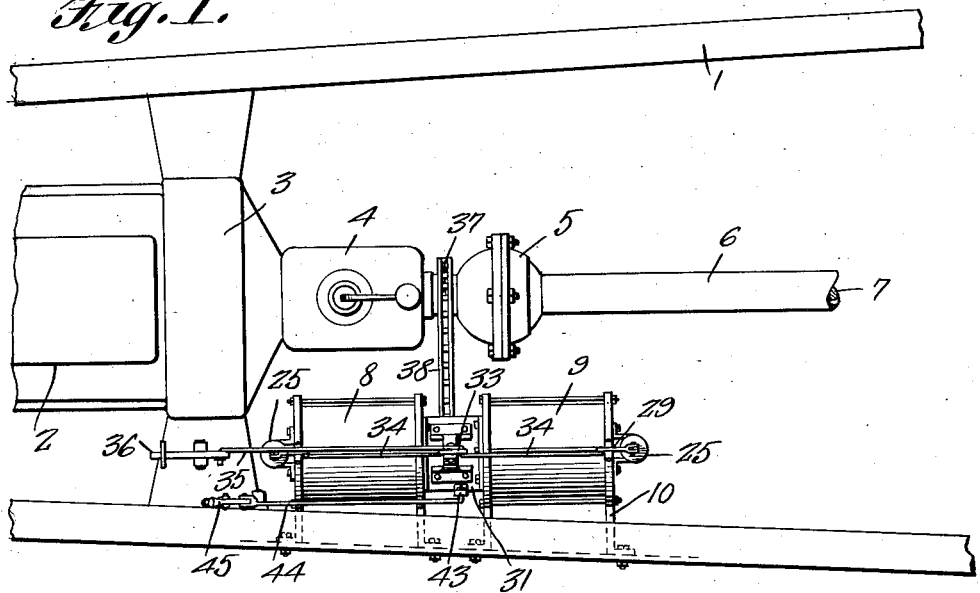
Figure 1 is a plan view of my brake mounted upon an automobile chassis.
Figure 3:
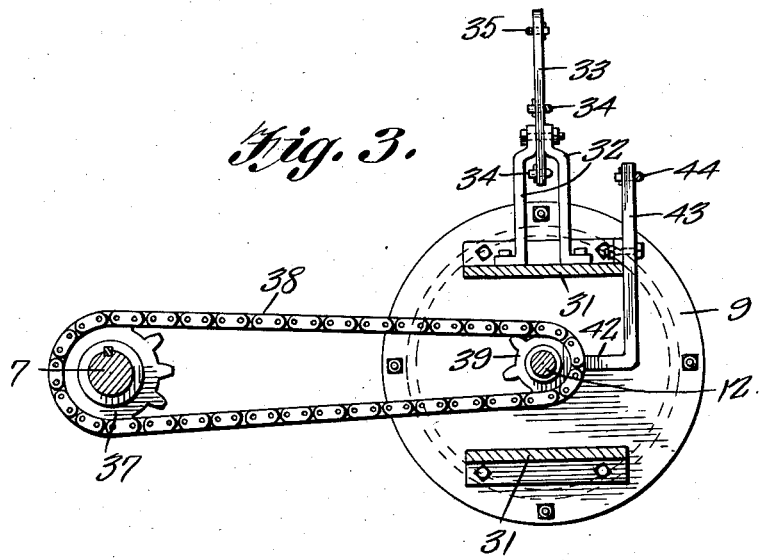
Figure 3 is a view, partly in elevation and partly in transverse section, showing the driving gearing.

The reference numeral 1 designates a portion of an automobile chassis, 2 the engine, 3 the clutch casing, 4 the transmission housing, 5 the universal joint, 6 the propeller shaft, and 7 the driving shaft connected with the propeller shaft by the universal joint, all these parts being well known and being illustrated in a conventional manner only.

In applying the invention to an automobile, two axially alined cylinders 8 and 9 are rigidly mounted upon the chassis in any convenient manner, as by brackets 10 secured to the sills and to the cylinder heads, the cylinders being completely filled with some non-compressible fluid, such as heavy oil. Suitable packing is provided between the heads and the end edges of the cylinders to prevent leakage, and stuffing boxes 11 are secured on the adjacent heads of the cylinders to prevent leakage around a shaft 12 which is journaled in and extends through said heads into the respective cylinders. On each end of the shaft, within the respective cylinders, is a hub or blade head 13 and blades or vanes 14 extend radially from diametrically opposite points of each hub, the blades in the two cylinders being relatively reversed so that the action will be balanced and torsional strain upon the supports will be minimized.

The vanes are formed with expanded journals or bearing disks 15 set in recesses provided therefor in the hubs and turnable upon anti-friction balls 16, as shown in Figures 5 and 6, and on the inner sides of said disks or journals are central stub shafts 17 which, within the chamber 18 of the hub, carry crank arms 19. An axial recess or cylinder 20 is formed in each end of the shaft 12 and opens into the respective chamber 18 and a piston 21 is mounted therein and yieldably held toward the open end thereof by an expansion spring 22 disposed between the piston and the closed end of the cylinder, links 23 pivoted to the piston and to the respective cranks, as shown in Figures 5, 6, and 7, transmitting the movement of the piston to the crank arms so as to turn the vanes. The springs 22 are of a tension to normally hold the vanes in such position that they are presented approximately edgewise to the direction of their travel, the springs acting in opposition to fluid pressure admitted to the respective hub chambers through pipes 24 which are alined with the shaft and enter the respective cylinders 8, 9, through the opposite ends thereof. The pipes 24 lead from the bottoms of reservoirs 25 which are mounted on the cylinders or other convenient supports and receive a quantity of oil which flows therefrom to fill the pipes 24 and the hub chambers 18. Plungers 26 are mounted in the reservoirs with a close running fit and bear upon the fluid therein so that if the plungers be forced downward, the oil will be driven to the hub chambers to force the pistons 21 back thereby rotating the vanes so that more or less of their areas will be presented to their direction of travel. If the vanes are presented edgewise they will readily cut through the liquid in the cylinders but if their faces be set across the line of travel their movement will be retarded or stopped so that the action of the moving element (in this instance, the driving shaft 7) will be arrested.

Secured to and rising from the plungers 26 are plunger rods 27 to the upper ends of which are pivoted links 28 connecting the rods to the outer arms of angle levers 29 which are fulcrumed at their bends upon posts 30 which may be erected upon the respective cylinders. The adjacent ends of the cylinders are connected by brackets 31 rigidly secured thereto, and upon the upper bracket is a post or standard 32 in the upper end of which is fulcrumed a lever 33, connecting rods 34 being pivoted at their inner ends to said lever respectively above and below the fulcrum thereof and at their outer ends to the inner arms of the angle levers. At the upper end of the lever 33 is attached the rear end of a connecting rod 35 which extends forward to a lever or pedal 36 within convenient reach of the operator. When the controlling element 36 is rocked forwardly, the plungers 26 will be forced downwardly to drive the liquid into the rotor chambers 18 within cylinders 8 and 9, and when rocked in the opposite direction the plungers will be raised and the liquid will be returned to the reservoirs, the angularity of the vanes being thus easily regulated.

A sprocket wheel 37 is secured upon the driving shaft between the transmission and the universal joint, and a sprocket chain 38 is trained around said wheel and a pinion 39 loose on the shaft 12 between the cylinders 8 and 9. The pinion 39 has a clutch face 40 on one side, and a clutch sleeve 41 is splined on the shaft adjacent the clutch face to engage the same and thereby lock the pinion to the shaft when desired. The clutch sleeve is provided with an annular groove in which is engaged a fork 42 at the lower end of a rocking arm or lever 43 which is fulcrumed between its ends upon the upper bracket 31 and to the upper end of which is attached a connecting rod 44 which extends forward to a lever or pedal 45 whereby the clutch members may be readily engaged or disengaged. In the operation when the pedal 45 is actuated the shaft 7 of the engine will be geared with the shaft 12 as the clutch 40 is controlled by this pedal and when the pedal 36 is operated the journals or disks 15 will be turned to vary the pitch of the vanes 14 and thereby changing the braking action of these vanes within the fluid in the cylinders 8.

Having described my invention, what I claim is:

1. A brake mechanism comprising axially alined cylinders filled with liquid, blades within the cylinders, means for rotating the blades about the axes of the cylinders, and means for varying the angularity of the blades, the blades in one cylinder being reversed relative to the blades in an adjacent cylinder.

2. A brake mechanism comprising a liquid-filled cylinder, a shaft journaled in an end of the cylinder, a hollow hub on the inner end of the shaft, radial vanes rotatably mounted on the hub, means in the hub tending constantly to hold the vanes in a set angular position, a reservoir on the cylinder, a pipe leading from the reservoir through an end of the cylinder and entering the hub in alinement with the shaft, a plunger in the reservoir, and means for raising and lowering the plunger whereby to draw liquid from the hub or drive liquid into the hub in opposition to the vane-holding means to vary the angularity of the vanes.

HARRY W. OTIS.